United States Patent
Manz et al.

(10) Patent No.: US 11,330,870 B2
(45) Date of Patent: *May 17, 2022

(54) THREE-DIMENSIONAL SHOE MANUFACTURING

(71) Applicant: adidas AG, Herzogenaurach (DE)

(72) Inventors: Gerd Rainer Manz, Oberreichenbach (DE); Jan Hill, Großenseebach (DE); Brian Hoying, Herzogenaurach (DE); Angus Wardlaw, Nuremberg (DE); Marco Kormann, Fürth (DE); Christian Lott, Kaiserslautern (DE)

(73) Assignee: adidas AG, Herzogenaurach (DE)

( * ) Notice: Subject to any disclaimer, the term of this patent is extended or adjusted under 35 U.S.C. 154(b) by 248 days.

This patent is subject to a terminal disclaimer.

(21) Appl. No.: 16/551,274

(22) Filed: Aug. 26, 2019

(65) Prior Publication Data

US 2019/0373987 A1 Dec. 12, 2019

Related U.S. Application Data

(63) Continuation of application No. 14/514,167, filed on Oct. 14, 2014, now Pat. No. 10,426,230.

(30) Foreign Application Priority Data

Oct. 16, 2013 (DE) .......................... 102013221020.5

(51) Int. Cl.
*A43D 119/00* (2006.01)
*A43D 95/00* (2006.01)
(Continued)

(52) U.S. Cl.
CPC ............ *A43D 119/00* (2013.01); *A43D 95/00* (2013.01); *A43D 111/00* (2013.01); *G06F 30/00* (2020.01);
(Continued)

(58) Field of Classification Search
CPC .......... A43D 3/00; A43D 3/02; A43D 119/00; A43D 2200/60
See application file for complete search history.

(56) References Cited

U.S. PATENT DOCUMENTS 1,680,670 A 8/1928 Donovan
1,820,952 A 9/1931 Whelton et al.
(Continued)

FOREIGN PATENT DOCUMENTS

CN 2660955 12/2004
CN 102497997 6/2012
(Continued)

OTHER PUBLICATIONS

"Foot Orthosis: Fabrication (You Tube Video)", available online at https://www.youtube.com/watchv=pDhpinxntgo, Apr. 11, 2013, 2 pages.
(Continued)

*Primary Examiner* — Ted Kavanaugh
(74) *Attorney, Agent, or Firm* — Kilpatrick Townsend & Stockton LLP

(57) ABSTRACT

Described are methods for the manufacture of a shoe, an apparatus to perform such method, as well as a shoe manufactured by such method. According to certain examples, the method for the manufacture of a shoe includes providing a three-dimensionally pre-shaped first shoe component and processing the three-dimensionally pre-shaped first shoe component, wherein the processing includes an individually controllable succession of processing steps.

13 Claims, 6 Drawing Sheets

(51) Int. Cl.
  *A43D 111/00* (2006.01)
  *G06Q 30/06* (2012.01)
  *G06F 30/00* (2020.01)
  *G06F 30/20* (2020.01)
  *A43B 1/04* (2022.01)

(52) U.S. Cl.
  CPC ......... *G06F 30/20* (2020.01); *G06Q 30/0621* (2013.01); *A43B 1/04* (2013.01); *A43D 2200/20* (2013.01); *A43D 2200/40* (2013.01); *A43D 2200/60* (2013.01)

(56) References Cited

U.S. PATENT DOCUMENTS

| | | | |
|---|---|---|---|
| 1,825,379 | A | 9/1931 | Zonino |
| 1,956,969 | A | 5/1934 | Ayers |
| 1,985,311 | A | 12/1934 | Brauer et al. |
| 2,002,580 | A | 5/1935 | MacDonald |
| 2,012,325 | A | 8/1935 | Tetlow |
| 2,034,091 | A | 3/1936 | Dunbar |
| 2,086,917 | A | 7/1937 | Lattemann |
| 2,141,213 | A | 12/1938 | Chapelle |
| 2,223,844 | A | 12/1940 | Cordeau |
| 2,344,503 | A | 3/1944 | Cuozzo |
| 2,440,393 | A | 4/1948 | Clark |
| 2,789,933 | A * | 4/1957 | Bargmeyer ............ B29D 35/06 428/447 |
| 2,893,059 | A * | 7/1959 | Capdevila ............... A43D 3/04 12/135 R |
| 3,199,149 | A | 8/1965 | Croyle |
| 3,329,983 | A | 7/1967 | Clamp |
| 3,667,883 | A | 6/1972 | Ludwig et al. |
| 3,696,456 | A | 10/1972 | Dunham et al. |
| 3,698,027 | A * | 10/1972 | Schwab ................ B29D 35/06 12/142 R |
| 3,863,284 | A * | 2/1975 | Liebscher ............... A43D 3/10 12/135 A |
| 3,881,205 | A * | 5/1975 | Funck .................... A43D 3/026 12/133 R |
| 3,961,390 | A | 6/1976 | Giordano |
| 3,972,086 | A | 8/1976 | Belli et al. |
| 4,068,995 | A | 1/1978 | Hayashi et al. |
| 4,181,994 | A | 1/1980 | Gruber |
| 4,266,312 | A | 5/1981 | Hall |
| 4,447,967 | A | 5/1984 | Zaino |
| 4,817,222 | A | 4/1989 | Shafir |
| 4,884,309 | A | 12/1989 | Shafir |
| 5,128,880 | A | 7/1992 | White |
| 5,205,232 | A | 4/1993 | Sadeh et al. |
| 5,216,594 | A | 6/1993 | White et al. |
| 5,231,723 | A | 8/1993 | White et al. |
| 5,255,352 | A | 10/1993 | Falk |
| 5,339,252 | A | 8/1994 | White et al. |
| 5,345,638 | A | 9/1994 | Nishida |
| 5,361,133 | A | 11/1994 | Brown et al. |
| 5,477,577 | A | 12/1995 | Hadley |
| 5,494,431 | A | 2/1996 | Telfer et al. |
| 5,537,946 | A | 7/1996 | Sadeh et al. |
| 5,671,055 | A | 9/1997 | Whittlesey et al. |
| 5,714,098 | A | 2/1998 | Potter |
| 5,885,500 | A | 3/1999 | Tawney et al. |
| 5,968,297 | A | 10/1999 | Hooker et al. |
| 6,085,126 | A | 7/2000 | Mellgren, III et al. |
| 6,216,619 | B1 | 4/2001 | Musco et al. |
| 6,353,770 | B1 | 3/2002 | Ramsey et al. |
| 6,367,397 | B1 | 4/2002 | Musco et al. |
| 6,473,667 | B1 | 10/2002 | Lee |
| 6,558,784 | B1 | 5/2003 | Norton et al. |
| 6,741,728 | B1 | 5/2004 | Genest |
| 6,755,141 | B2 | 6/2004 | Musco et al. |
| 6,829,377 | B2 | 12/2004 | Milioto |
| 6,879,945 | B1 | 4/2005 | Cook |
| 7,114,260 | B2 | 10/2006 | Nguyen et al. |
| 7,146,751 | B2 | 12/2006 | Seamans |
| 7,552,494 | B2 | 6/2009 | Peterson |
| 7,818,217 | B2 | 10/2010 | Jones et al. |
| 8,162,022 | B2 | 4/2012 | Hull et al. |
| 8,348,371 | B2 | 1/2013 | McDowell et al. |
| 8,701,232 | B1 | 4/2014 | Droege et al. |
| 8,701,733 | B2 | 4/2014 | Leedy |
| 8,751,320 | B1 | 6/2014 | Kemist |
| 8,755,925 | B2 | 6/2014 | Regan et al. |
| 8,838,263 | B2 | 9/2014 | Sivak et al. |
| 8,904,671 | B2 | 12/2014 | Dojan et al. |
| 8,906,275 | B2 | 12/2014 | Davis et al. |
| 9,005,710 | B2 | 4/2015 | Jones et al. |
| 9,024,939 | B2 | 5/2015 | Sabiston et al. |
| 9,070,160 | B2 | 6/2015 | Dirsa et al. |
| 9,175,428 | B2 | 11/2015 | Huang et al. |
| 9,201,413 | B2 | 12/2015 | Hanft |
| 9,260,807 | B2 | 2/2016 | Chang et al. |
| 9,447,532 | B2 | 9/2016 | Jurkovic et al. |
| 9,681,709 | B2 | 6/2017 | Manz et al. |
| 10,028,552 | B2 | 7/2018 | Manz et al. |
| 10,426,230 | B2 | 10/2019 | Manz et al. |
| 10,463,114 | B2 | 11/2019 | Manz et al. |
| 2002/0138923 | A1 | 10/2002 | Shaffeeullah |
| 2003/0110582 | A1 | 6/2003 | Torielli et al. |
| 2004/0143452 | A1 | 7/2004 | Pattillo et al. |
| 2004/0168329 | A1 | 9/2004 | Ishimaru |
| 2005/0049816 | A1 | 3/2005 | Oda et al. |
| 2005/0071242 | A1 | 3/2005 | Allen et al. |
| 2005/0089822 | A1 | 4/2005 | Geng |
| 2006/0123567 | A1 | 6/2006 | Morlacchi |
| 2006/0143839 | A1 * | 7/2006 | Fromme .................. A43B 7/00 12/142 R |
| 2006/0150399 | A1 | 7/2006 | Koyama |
| 2006/0155417 | A1 | 7/2006 | Cremaschi et al. |
| 2008/0010856 | A1 | 1/2008 | Hakkala |
| 2008/0028544 | A1 | 2/2008 | Park |
| 2008/0147219 | A1 | 6/2008 | Jones et al. |
| 2008/0189194 | A1 | 8/2008 | Bentvelzen |
| 2008/0257500 | A1 | 10/2008 | Palmer |
| 2009/0019648 | A1 | 1/2009 | Jones et al. |
| 2009/0113756 | A1 | 5/2009 | Chang |
| 2009/0140470 | A1 | 6/2009 | Dua et al. |
| 2009/0208113 | A1 | 8/2009 | Bar |
| 2010/0017974 | A1 | 1/2010 | RongBo |
| 2010/0036753 | A1 | 2/2010 | Harvill et al. |
| 2010/0084083 | A1 | 4/2010 | Hull et al. |
| 2010/0115792 | A1 | 5/2010 | Muller |
| 2010/0238271 | A1 | 9/2010 | Pfeiffer et al. |
| 2010/0275461 | A1 | 11/2010 | Cook et al. |
| 2010/0293075 | A1 | 11/2010 | Chen et al. |
| 2010/0293076 | A1 * | 11/2010 | End ........................ G06Q 30/06 705/26.7 |
| 2010/0318442 | A1 | 12/2010 | Paul et al. |
| 2010/0326591 | A1 | 12/2010 | Langvin et al. |
| 2011/0109686 | A1 | 5/2011 | McDowell et al. |
| 2011/0134123 | A1 | 6/2011 | Salcolm et al. |
| 2011/0154584 | A1 | 6/2011 | Ungari et al. |
| 2011/0232008 | A1 * | 9/2011 | Crisp ....................... A43B 9/00 12/18.1 |
| 2011/0277250 | A1 * | 11/2011 | Langvin ................ A43D 3/1408 12/133 R |
| 2012/0023686 | A1 | 2/2012 | Huffa et al. |
| 2012/0111487 | A1 * | 5/2012 | Hull ........................ B32B 37/10 156/217 |
| 2012/0175813 | A1 | 7/2012 | Leedy |
| 2012/0255201 | A1 | 10/2012 | Little |
| 2013/0125319 | A1 | 5/2013 | Regan |
| 2013/0131854 | A1 | 5/2013 | Regan et al. |
| 2013/0159866 | A1 | 6/2013 | Dirsa et al. |
| 2013/0191240 | A1 | 7/2013 | Lasry |
| 2013/0283548 | A1 | 10/2013 | Wang |
| 2013/0285294 | A1 | 10/2013 | Huang et al. |
| 2013/0320584 | A1 | 12/2013 | Davis et al. |
| 2014/0000044 | A1 | 1/2014 | Boardman et al. |
| 2014/0189964 | A1 | 7/2014 | Wen et al. |
| 2014/0201024 | A1 | 7/2014 | Collier et al. |
| 2014/0237737 | A1 | 8/2014 | Regan et al. |
| 2014/0259459 | A1 | 9/2014 | Ianchulev et al. |
| 2014/0304792 | A1 | 10/2014 | Derchak et al. |

(56) References Cited

U.S. PATENT DOCUMENTS

| | | |
|---|---|---|
| 2014/0352173 A1 | 12/2014 | Bell et al. |
| 2015/0196098 A1 | 7/2015 | Dirsa et al. |
| 2015/0201711 A1 | 7/2015 | Jurkovic et al. |
| 2018/0129185 A1 | 5/2018 | Jurkovic et al. |

FOREIGN PATENT DOCUMENTS

| | | |
|---|---|---|
| CN | 102802456 | 11/2012 |
| CN | 102345210 | 7/2013 |
| DE | 2845883 | 4/1980 |
| DE | 19700171 | 7/1998 |
| DE | 60318392 | 1/2009 |
| DE | 102009049776 | 6/2010 |
| DE | 102011009641 | 4/2013 |
| EP | 990399 | 4/2000 |
| EP | 1424021 | 6/2004 |
| EP | 1640144 | 3/2006 |
| EP | 2564719 | 3/2013 |
| EP | 2587436 | 5/2013 |
| EP | 2649898 | 10/2013 |
| EP | 2786670 | 10/2014 |
| EP | 2792264 | 10/2014 |
| EP | 2792265 | 10/2014 |
| EP | 2839755 | 2/2015 |
| GB | 1439101 | 6/1976 |
| GB | 2091535 | 8/1982 |
| JP | 54163141 | 12/1979 |
| JP | 58047868 | 3/1983 |
| JP | S59154108 | 10/1984 |
| JP | 2000279201 | 10/2000 |
| JP | 2012531261 | 12/2012 |
| JP | 2013511093 | 3/2013 |
| WO | 9722273 | 6/1997 |
| WO | 9830121 | 7/1998 |
| WO | 9916250 | 4/1999 |
| WO | 9932276 | 7/1999 |
| WO | 2006048024 | 5/2006 |
| WO | 2008119683 | 10/2008 |
| WO | 2010037035 | 4/2010 |
| WO | 2013074958 | 5/2013 |

OTHER PUBLICATIONS

U.S. Appl. No. 14/514,167, "Advisory Action", dated May 20, 2016, 4 pages.
U.S. Appl. No. 14/514,167, "Corrected Notice of Allowability", dated Oct. 30, 2018, 2 pages.
U.S. Appl. No. 14/514,167, "Final Office Action", dated Jun. 5, 2017, 20 pages.
U.S. Appl. No. 14/514,167, "Final Office Action", dated Mar. 10, 2016, 21 pages.
U.S. Appl. No. 14/514,167, "Non Final Office Action", dated Nov. 14, 2016, 18 pages.
U.S. Appl. No. 14/514,167, "Non-Final Office Action", dated Sep. 4, 2015, 19 pages.
U.S. Appl. No. 14/514,167, "Non-Final Office Action", dated Mar. 22, 2018, 23 pages.
U.S. Appl. No. 14/514,167, "Notice of Allowance", dated Oct. 11, 2018, 5 pages.
U.S. Appl. No. 14/514,167, "Notice of Allowance", dated May 29, 2019, 7 pages.
Chinese Application No. 201410543499.0, "Office Action", dated May 30, 2016, 8 pages.
German Application No. 102013221020.5, "Office Action", dated Apr. 12, 2019, 14 pages (9 pages of English translation and 5 pages of Original document).
German Application No. 102013221020.5, "Office Action", dated Mar. 3, 2017, 10 pages.
German Application No. 102013221020.5, "Office Action", dated Sep. 29, 2014, 6 pages.
European Patent Application No. 14188270.4, "European Search Report", dated Mar. 26, 2015, 7 pages.
European Patent Application No. 14188270.4, "Office Action", dated Mar. 14, 2019, 4 pages.
European Patent Application No. 14188270.4, "Office Action", dated Oct. 31, 2019, 6 pages.
Japanese Application No. 2014-178794, "Office Action", dated Jul. 24, 2018, 13 pages (7 pages of English translation and 6 pages of Original document).
Japanese Application No. 2014-178794, "Office Action", dated Feb. 5, 2019, 8 pages (4 pages of English translation and 4 pages of Original document).

\* cited by examiner

THREE-DIMENSIONAL SHOE MANUFACTURING

CROSS REFERENCE TO RELATED APPLICATION

This is a continuation of U.S. patent application Ser. No. 14/514,167 filed Oct. 14, 2014, entitled THREE-DIMENSIONAL SHOE MANUFACTURING ("the '167 application"), which is related to and claims priority benefits from German Patent Application No. DE102013221020.5, filed on Oct. 16, 2013, entitled SPEEDFACTORY 3D ("the '020 application"). The '167 and '020 applications are hereby incorporated in their entirety by this reference.

FIELD OF THE INVENTION

The present invention relates to a method for the manufacture of a shoe, an apparatus to perform such method, as well as a shoe manufactured by such method.

BACKGROUND

The manufacture and sale of sportswear entails a significant number of new product designs each year for manufacturers, which are essential to keep pace with the latest developments on the market or to promote development itself. Such designs comprise shoes, textiles and accessories in a plurality of models, designs, production options, coloring, sizing, etc., for example. In this regard, most of the new products are designed, modeled and tested digitally by 3D CAD/FEA (finite element analysis) systems today.

In order to bring a new product on the market, samples are first made manually from the digital design drafts, typically in factories located at a different place than the development department that is responsible for the product design. As a result, it is often only after shipment, often via ship containers, and receipt of the real samples that the product designers are able to further optimize their digital drafts and return them to the factories. This process is repeated until the samples have the desired functionality, design, cost and quality and may then be released for serial production in the factories. This process often takes several weeks to months until a result is reached, and the entire delivery chain is very inflexible. Thus, a manufacturer is only able to react slowly to fast-moving, fashion market trends and demands. The benefit regarding speed gained by the use of CAD/FEA systems throughout is lost by the overall slow production processes by the factories all over the world.

In certain designs, conventional manufacturing apparatuses are often only able to process flat workpieces. Therefore, a three-dimensional model generated in the computer has to be projected into a two-dimensional plane first, which may result in undesired material warping, buckling and distortions in the finished product.

It is therefore an object of the present invention to provide manufacturing methods and production means that allow to prompt, at least partially automatic, and/or local manufacture of a plurality of different prototypes and the like in order to proceed from the "idea to the product" more rapidly. In doing so, it should be possible for the three-dimensional models designed on the computer to be transformed into corresponding three-dimensional products as directly as possible. Further, it is desirable that the manufacture of individual items, in particular customized individual items, small-scale series, or series be possible in an uninterrupted manner and be freely scalable so that the production of a (small-scale) series may be merely x times a single production step.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a method for the manufacture of a shoe comprises providing a three-dimensionally pre-shaped first shoe component, and processing the three-dimensionally pre-shaped first shoe component, wherein the processing comprises an individually controllable succession of processing steps.

In some embodiments, the individually controllable succession of processing steps is determined from a computer generated shoe model. The computer generated shoe model may be selected from a predetermined set of shoe models that are stored on a computer. The computer generated shoe model may also be selected by setting one or more parameters.

During processing, the three-dimensionally pre-shaped first shoe component may be arranged on a mounting device comprising a shape that at least partially corresponds to the three-dimensional pre-shape of the first shoe component. In some embodiments, the mounting device comprises a last. The last may further comprise a variable volume.

In certain embodiments, the three-dimensionally pre-shaped first shoe component comprises at least a part of a shoe upper.

According to certain embodiments of the present invention, a method for the manufacture of a shoe comprises manufacturing a three-dimensionally pre-shaped first shoe component around a mounting device, and processing the three-dimensionally pre-shaped first shoe component, wherein the processing comprises an individually controllable succession of processing steps.

In some embodiments, manufacturing the three-dimensionally pre-shaped first shoe component around the mounting device comprises at least one of three-dimensional weft knitting, three-dimensional warp knitting, braiding, vacuum forming, injection molding, slush molding, casting, pouring, spraying a three-dimensional shape, wrapping a three-dimensional shape, or printing. In further embodiments, manufacturing the three-dimensionally pre-shaped first shoe component around the mounting device comprises circular knitting the three-dimensionally pre-shaped first shoe component.

In certain embodiments, the method further comprises passing the three-dimensionally pre-shaped first shoe component through at least one processing station and processing the three-dimensionally pre-shaped first shoe component in the at least one processing station.

In some embodiments, processing the three-dimensionally pre-shaped first shoe component in the at least one processing station comprises performing at least one of the following processing steps: screen printing, digital printing, dye sublimation, sublimation printing, pad printing, spraying on color, applying at least one color-changing material, applying at least one foil element, impregnating with a material, coating with a material, applying at least one glue, flocking, laser cutting, laser engraving, embroidering, thermoforming, locally melting, locally fusing, embossing, laser etching, and/or perfing. In further embodiments, processing the three-dimensionally pre-shaped first shoe component in the at least one processing station comprises adding at least one second shoe component to the three-dimensionally pre-shaped first shoe component.

The at least one second shoe component may comprise at least one of an eyelet, heel cap, toe cap, decoration element, decoration stripe, friction element, abrasion protection element, rib element, reinforcement element, stiffening element, supporting element, cushioning element, fiber element, sole element, or outsole. In some embodiments, the at least one second shoe component is added to the three-dimensionally pre-shaped first shoe component by at least one of gluing, welding, high frequency welding, ultrasonic welding, laser welding, pressing, sewing, screwing, riveting, melting together, clipping together, sealing, subjecting to a heat and pressure treatment, or subjecting to a steaming treatment.

According to some embodiments, providing the three-dimensionally pre-shaped first shoe component comprises manufacturing the three-dimensionally pre-shaped first shoe component around a mounting device. In some embodiments, processing the three-dimensionally pre-shaped first shoe component in the at least one processing station comprises removing the three-dimensionally pre-shaped first shoe component from the mounting device.

The at least one processing station may comprise at least one processing tool that is used in accordance with the individually controllable succession of processing steps. In some embodiments, the at least one processing station learns the use of the at least one processing tool via interaction with a human. The interaction may comprise demonstrating a movement pattern for the use of the at least one processing tool.

In some embodiments, the three-dimensionally pre-shaped first shoe component comprises at least a part of a shoe upper.

According to certain embodiments of the present invention, a method for the manufacture of a plurality of shoes comprises providing a plurality of three-dimensional pre-shaped first shoe components for the manufacture of a plurality of shoes, wherein at least one of the plurality of three-dimensional pre-shaped first shoe components is configured for a different shoe model from at least a second one of the plurality of three-dimensional pre-shaped first shoe components, and processing the plurality of three-dimensionally pre-shaped first shoe components to produce the plurality of shoes, wherein at least one of the plurality of shoes is a different shoe model from at least a second one of the plurality of shoes, wherein the processing comprises an individually controllable succession of processing steps that proceed in an automated manner without manual intervention.

BRIEF DESCRIPTION OF THE DRAWINGS

In the following detailed description, various embodiments of the present invention are described with reference to the following figures.

BRIEF DESCRIPTION

Figure 1:
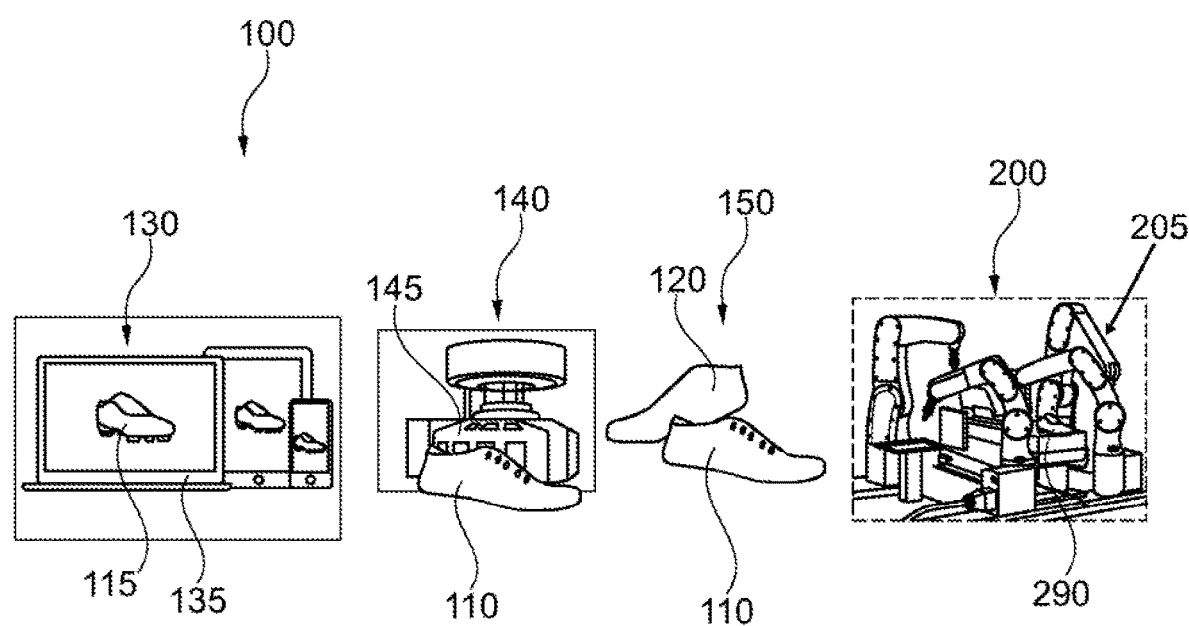
FIG. 1 is a schematic illustrating a method of manufacture of a shoe, according to certain embodiments of the present invention.

According to a first aspect of the present invention, this object is at least partially achieved by a method for the manufacture of a shoe which comprises providing a three-dimensionally pre-shaped first shoe component and processing the three-dimensionally pre-shaped first shoe component, wherein the processing comprises an individually controllable sequence of processing steps. In certain embodiments, the processing may also rearrange the individually controllable sequence of processing steps.

It has to be pointed out here already that although the embodiments of the invention are described in relation to sports shoes in the following, the present invention is not limited to these embodiments. Rather, the present invention may also be used for other types of sportswear, e.g. shirts, pants, gloves, etc. In addition, the invention may also be applied to the manufacture of sports equipment, such as balls, bags, backpacks, helmets, heads, belts, and other kind of accessories.

Moreover, certain embodiments of the method according to the invention may run automatically to a large extent as well as that a certain amount of manual support work is carried out.

That is, embodiments of a method according to the invention may be carried out, at least predominantly, by robots, robotic systems or automated systems and/or the embodiments may include a certain amount of human (support) work. The robots, robotic systems or automated systems may further be equipped with hardware and/or software specifically adapted to the respective tasks or they may be general-purpose machines.

As previously mentioned, conventional manufacturing methods are frequently based on an initially two-dimensional shoe element, such as a part of a shoe upper, which is only put into the desired three-dimensional shape afterwards, e.g. by finishing stitching at the toe, bottom and/or heel. This process may result in undesired warping of the material and the possibly required seams may later rub the wearer's foot. These design considerations may be addressed by a three-dimensionally pre-shaped first shoe component being provided, which is then processed further.

The corresponding transfer of a three dimensional shoe design into two dimensions is therefore not always necessary.

The individually controllable sequence and/or rearrangement of processing steps, to which the three-dimensionally pre-shaped first shoe component is subjected, further enables the manufacture of diversely designed shoes by embodiments of the method according to the invention. The method may particularly run in an automated manner to a large extent in a manufacturing or processing apparatus (see below), without manual intervention or an alteration of the apparatus being necessary for the manufacture of different shoe models or prototypes.

The individually controllable sequence and/or rearrangement of processing steps may be determined from a computer generated shoe model.

A benefit of computer generated shoe models may be that they may be modified in real time, so that the effects of the modification may be made directly visible to a design developer or also to a future wearer of the shoe, for example. Thus, involving computer generated shoe models may simplify the selection of the shoe model to be manufactured and design it in a more user-friendly manner. The sequence and/or rearrangement of processing steps necessary for manufacturing the selected shoe may then be determined automatically, so that even a layperson, for example a customer or future wearer of the shoe, is able to select the shoe model to be manufactured and cause it to be manufactured. In certain embodiments, the sequence of processing steps necessary for manufacturing the selected shoe may also be rearranged to determine alternative and optimal manufacturing processes.

The shoe model may be selected from a predetermined set of shoe models that are stored on a computer.

This helps to further simplify selection of the shoe model to be manufactured, since the shoe model does not have to be assembled from its individual components "from scratch", but is selected from a predetermined set of stored shoe models. Herein, however, the predetermined set itself may depend on further parameters being input (e.g. men's shoes, women's shoes, sports shoes, leisure shoes, etc.). In certain embodiments, in a kind of construction-kit system, the shoe model to be manufactured is selected and/or assembled from pre-stored shoe models and/or functional groups, e.g. from a selection of shoe uppers, soles of shoes, inner soles, etc.

In certain embodiments, the shoe model is selected by setting one or more parameters.

A future wearer could, for example, enter his (or her) shoe size, the width of his forefoot, his weight, whether he has a neutral behavior of rolling over or tends to overpronate/underpronate, the desired intended use, the desired color, etc., in response to which a computer, for example, selects a shoe model which meets these requirements, which is then manufactured. This may allow a particularly detailed selection of the shoe to be manufactured.

The three-dimensionally pre-shaped first shoe component may be arranged on a mounting device during processing which comprises a shape that at least partially corresponds to the three-dimensional pre-shape of the first shoe component.

By arranging on a mounting device, it is possible in a particularly simple manner to move along the three-dimensionally pre-shaped first shoe component for the individual sequence and/or rearrangement of processing steps, if necessary, e.g. to a new processing station and/or to reposition it. By the mounting device comprising a shape that at least partially corresponds to the three-dimensional pre-shape of the first shoe component, particularly good fixation of the three-dimensionally pre-shaped first shoe component on the mounting device may be achieved, on the one hand, so that it does not shift during processing. Such a result may be desirable, for example, for precise positioning while further shoe components are added or seams, holes, apertures, lettering/decoration, etc. are applied. On the other hand, this prevents the material of the three-dimensionally pre-shaped first shoe component from noticeably losing shape or undesirably deforming in another manner during processing.

The mounting device may comprise a last. In some embodiments, the last comprises a variable volume, which may be designed to be inflatable. Other possibilities of an adjustable last would be a last comprising one or more shape memory materials, which could be compressed for insertion into the three-dimensionally pre-shaped first shoe component but then return to their original shape and volume. Also, magnetorheological fluids could be used.

In this context, a last may be well suited for achieving the desired results mentioned above, since it corresponds to the shape of a foot on which the shoe is ultimately to be worn at least to a large degree. By an adjustable last, for example an inflatable last, it is possible, on the one hand, for a single last to be used for various shoe sizes. If the inflatable last comprises several individually inflatable chambers or the like, the last may be individually adjusted to a foot of a future wearer. This may result in a better fit of the manufactured shoe.

Providing the three-dimensionally pre-shaped first shoe component may comprise a manufacture of the three-dimensionally pre-shaped first shoe component around the mounting device.

By manufacturing the three-dimensionally pre-shaped first shoe component directly around the mounting device, it is no longer necessary for the three-dimensional first shoe component to be mounted separately on the last. As a result, there are high requirements on the tools needed to pre-shape the first shoe component directly around the mounting device mechanically and in an automated manner. Despite the higher demands on the tooling, direct manufacture around the mounting device provides a pre-shaped first shoe component that is particularly stable, fits precisely, and is free from warping.

Providing a three-dimensionally pre-shaped first shoe component may comprise one or more of the following methods for the manufacture of the three-dimensionally pre-shaped first shoe component: three-dimensional weft knitting, three-dimensional warp knitting, braiding, vacuum forming, injection molding, slush molding, casting, pouring, spraying or wrapping of a three-dimensional shape, printing.

Depending on the intended purpose of use and thus the materials which come into consideration, one or several of the above-mentioned methods may be used in order to provide a three-dimensionally pre-shaped first shoe component, on the basis of which the entire shoe may then be manufactured. In this regard, three-dimensional weft-knitting, warp-knitting, braiding, or the like come into consideration for a textile first shoe component, for example, and vacuum forming, injection molding, slush molding, casting, pouring, spraying or wrapping of a three-dimensional form or printing come into consideration for first shoe components made from synthetic material, for example. It is also possible for the first shoe component to be manufactured in a multilayered manner, e.g. from multilayer laminates. For example, three-dimensional weft-knitting may occur first and then a plastic or elastomer layer may be sprayed on in order to provide the three-dimensionally pre-shaped first shoe component, etc. Also, fibers could be used as a base material, resulting in a three-dimensionally pre-shaped first shoe component comprising a non-woven textile material.

The method for manufacturing the three-dimensionally pre-shaped first shoe component may comprise a circular knitting of the first shoe component.

Circular knitting allows the provision of particularly distortion-free and blemish-free three-dimensionally pre-shaped workpieces, which are furthermore free from bothering seams, which may be desirable for certain applications, for example in a shoe upper.

The three-dimensionally pre-shaped first shoe component may pass through at least one processing station during processing.

For example, the three-dimensionally pre-shaped first shoe component may automatically be transported, particularly on a mounting device as described above, to one or more processing stations in which it is further processed. The type and order of the processing steps undergone by the three-dimensionally pre-shaped first shoe component herein is individually controllable for each three-dimensionally pre-shaped first shoe component, so that a very high level of flexibility is achieved. In certain embodiments, a plurality of processing steps may be carried out within a processing station, with it also being possible in this context for the exact sequence and/or rearrangement of processing steps and processing parameters to be individually adjusted for every three-dimensionally pre-shaped first shoe component. Moreover, all this may occur in an automated manner to a large extent.

In certain embodiments, in the at least one processing station, at least one of the following processing steps is performed: screen printing, digital printing, dye sublimation, sublimation printing, pad printing, spraying on color, applying at least one color-changing material, applying at least one foil element, impregnating with a material, coating with a material, applying at least one glue, flocking, laser cutting, laser engraving, embroidering, thermoforming, locally melting, locally fusing, embossing, laser etching, 3-D printing, and/or perfing.

It is therefore possible to individually impart a plurality of e.g. optical and haptic properties onto the three-dimensionally pre-shaped first shoe component, without the modification of a production means or conversion of the method becoming necessary for this. Since the first shoe component is further already three-dimensionally pre-shaped, noteworthy distortions/buckling of the elements applied in this step may not occur in the further course of the processing. This is important in case of elements serving the purpose of decoration, such as lettering, logos, etc., for example.

In certain embodiments, the at least one processing station adds at least one second shoe component to the three-dimensionally pre-shaped first shoe component.

By adding at least one second shoe component to the three-dimensionally pre-shaped first shoe component, the number of possible manufacture forms which may be implemented by embodiments of the present method is increased. In this context, adding at least one second shoe component and the above-mentioned processing steps which may be carried out in the at least one processing station may complement each other.

It is possible, for example, that the at least one second shoe component comprises one or more of the following shoe elements: eyelets, heel caps, toe caps, decoration elements, decoration stripes, friction elements, abrasion protection elements, rib elements, reinforcement elements, stiffening elements, supporting elements, cushioning elements, fiber elements, sole elements, outsoles.

Such functional elements may serve the purpose of influencing the wearing properties of a shoe so that the individually controllable addition of such components allows producing a plurality of shoes for the most different purposes by certain embodiments of the present method.

In certain embodiments, the at least one processing station is further provided to connect the second shoe component with the three-dimensionally pre-shaped first shoe component by one or more of the following steps: gluing, welding, high frequency welding, ultrasonic welding, laser welding, pressing, sewing, screwing, riveting, melting together, clipping together, sealing, subjecting to a heat and pressure treatment, subjecting to a steaming treatment.

In this context, depending on the materials of the three-dimensionally pre-shaped first shoe component and/or the second shoe component, one or more of the above-mentioned connecting methods may be used. This allows the connecting method(s) to be optimally adjusted to the respective properties of the shoe to be currently manufactured, thus providing optimum stability.

The at least one processing station may be provided to remove the three-dimensionally pre-shaped first shoe component and/or the second shoe component from the mounting device.

This allows the three-dimensionally pre-shaped first shoe component and/or the second shoe component to be subject to further processing steps elsewhere or packaging them for shipping, etc., if necessary.

It is possible that the at least one processing station comprises one or more processing tools, which are used in accordance with the individual sequence and/or rearrangement of processing steps.

Due to this, several processing steps may occur within a single processing station, so that moving along or repositioning of the first and/or second shoe components is no longer required.

In certain embodiments, the processing station learns the use of at least one processing tool via interaction with a human.

Since three-dimensionally pre-shaped workpieces may be processed with the method, the movement sequences and movement patterns which a processing tool has to carry out within a given processing step may be extremely complex patterns. Training the machine by a human may thus be substantially more effective than conventionally programming the machine.

Herein, the interaction may comprise demonstrating a movement pattern for the use of the at least one processing tool.

Humans are often superior to machines in carrying out complex movement patterns, as just described. Therefore, demonstrating a movement pattern may further simplify training the machine and may result in improved results in manufacture.

The three-dimensionally pre-shaped first shoe component may comprise at least a part of a shoe upper.

The three-dimensionally pre-shaped first shoe component may then serve as a basic element for manufacturing the shoe, on or to which all or at least a part of the further desired properties are then successively imparted or added during manufacture. Thus, three-dimensionally pre-shaped first shoe components formed as a part of a shoe upper are very well suited for realizing a manufacturing method which is automated to a large extent but extremely flexible nonetheless.

A further aspect of the present invention is constituted by an apparatus which is provided for performing embodiments of a method according to the invention.

With such an apparatus, a plurality of differently designed shoes may be manufactured automatically to a large extent, starting from the three-dimensionally pre-shaped first shoe component.

Herein, the apparatus may comprise an interface for the selection of the shoe model by a future wearer of the shoe.

Thus, the future wearer is able to precisely adjust the shoe to be manufactured to their individual requirements and thus have a shoe model manufactured in the sense of a "custom fit" which is particularly suitable for them.

In certain embodiments, the apparatus is arranged inside a movable container. Herein, the container may be at least partially transparent. Moreover, the container could be also a combination of multiple containers which may be combined into one production unit.

This allows transportation and provision of the apparatus directly "on site", for example at sporting events or at trade fairs, but also in a store's showroom. A purchaser may then, particularly in combination with the aforementioned interface, "put together" a desired shoe model, or more generally a desired sport product, directly at the site of the apparatus or even beforehand via the internet or in a store, this model or product then being manufactured by the manufacturing apparatus. If the container is partially transparent, the customer may even watch the shoes or products being manufactured. In addition, the process could be captured by video and live broadcasted in digital media networks/channels.

A further aspect of the present invention is a shoe, wherein the shoe has been manufactured by use of embodiments of a method according to the invention.

As already repeatedly mentioned, it is possible, in this respect, for the manufactured shoe to be individually customized and modified, for example based on a design of a development designer or even based on a customer's wishes.

At this point, it shall be explicitly pointed out that for embodiments of a method according to the invention, embodiments of an apparatus according to the invention and/or embodiments of a shoe according to the invention, multiple design possibilities and embodiments disclosed herein may be combined with one another depending on the specific requirements. Individual options and design possibilities described herein may also be disregarded where they appear to be dispensable for the respective method, the respective apparatus, or the shoe to be manufactured, respectively, with the resulting embodiments still being part of the invention.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Certain embodiments of the invention are described in the following detailed description with regard to sports shoes. The present invention is not, however, limited to these embodiments. Rather, the present invention may also be used in other types of sportswear, e.g. sports shirts, sports pants, gloves, etc. Moreover, the present invention may also be used in the manufacture of balls, bags, backpacks, helmets, heads, belts, and other kinds of accessories.

FIG. 1 shows embodiments of a method 100 according to the invention for the manufacture of a shoe 290. In certain embodiments, the method 100 comprises the following steps: providing 140 a three-dimensional pre-shaped first shoe component 110 and processing 200 the three-dimensionally pre-shaped first shoe component 110, wherein the processing 200 comprises an individually controllable sequence and/or rearrangement of processing steps.

In certain embodiments, the method 100 comprises providing a plurality of three-dimensional pre-shaped first shoe components 110 for the manufacture of a plurality of shoes 290, wherein at least one of the plurality of three-dimensional pre-shaped first shoe components 110 is configured for a different shoe model from at least a second one of the plurality of three-dimensional pre-shaped first shoe components 110, and processing 200 the plurality of three-dimensionally pre-shaped first shoe components 110 to produce the plurality of shoes 290, wherein at least one of the plurality of shoes 290 is a different shoe model from at least a second one of the plurality of shoes 290, wherein the processing comprises an individually controllable succession of processing steps that proceed in an automated manner without manual intervention.

Figure 2:
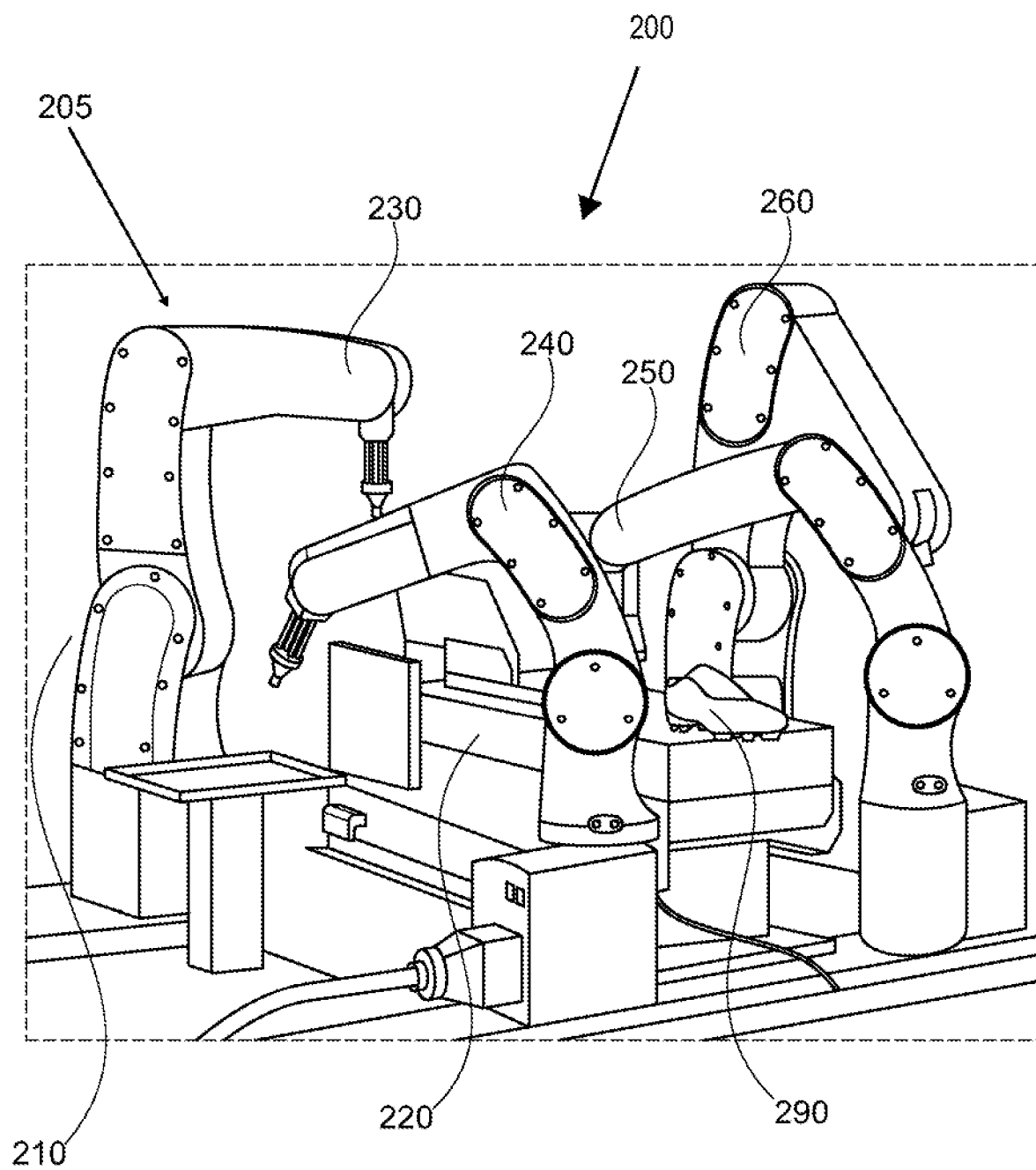
FIG. 2 is a perspective view of an apparatus with at least one processing station for implementing a method of manufacture of a shoe, according to certain embodiments of the present invention.

In this context, both the providing 140 and the further processing 200 may take place in a single manufacturing or processing apparatus intended for this, for example in the processing apparatus 205 discussed in more detail with regard to FIG. 2. However, it is also possible that, as suggested in FIG. 1, the providing 140 and the further processing 200 take place at separate manufacturing or processing apparatuses, respectively. In the embodiments shown in FIG. 1, the providing 140 occurs at a station 145 that may intended for this purpose, for example. The further processing 200 then occurs in the processing apparatus 205. Details in this regard will be explained in more detail below.

In the method 100 shown in FIG. 1, the three-dimensionally pre-shaped first shoe component 110 may be a shoe upper 110 or a part of such a shoe upper. However, it is also possible that the three-dimensionally pre-shaped first shoe component 110 is another shoe element, such as a part of a sole or the like. In certain embodiments, a plurality of three-dimensionally pre-shaped first shoe components 110 may be provided, wherein at least one of the plurality of three-dimensionally pre-shaped first shoe components 110 may be configured for a different shoe model from at least a second one of the plurality of three-dimensionally pre-shaped first shoe components 110.

The three-dimensionally pre-shaped first shoe component 110 may be arranged on a mounting device 120 during processing 200, which mounting device 120 comprises a shape that at least partially corresponds to the three-dimensional pre-shape of the first shoe component 110. This may serve the purpose of the three-dimensionally pre-shaped first shoe component 110 being able to be moved along well and positioned precisely during processing 200, which may be desirable for precise processing and/or processing that is substantially free of substandard goods. This may also prevent or minimize undesired warping of the material, deformations of the material or damage to the material during the further processing steps of a method 200.

In certain embodiments, the mounting device 120 comprises a last 120.

The last 120 may, for example, comprise an engagement (not shown), which allows the last 120 together with the three-dimensionally pre-shaped first shoe component 110 to be picked up automatically and without human assistance with a processing tool, e.g. a gripper arm, and to move it through the different processing steps of the method 200.

The last 120 could, for example, be an additive manufactured last 120 built individually for each consumer to achieve a customized fit of the shoe 290. Other methods to generate a rigid 3D-shaped last 120, or more generally a rigid 3D-shaped mounting device 120, may also be obvious to a person of ordinary skill in the relevant art. In certain embodiments, milling the last 120 based on 3D CAD files is mentioned here.

In further embodiments of the method 100, the last 120 is adjustable in size. In some embodiments, the last 120 comprises a variable volume, so that it is able to adjust to the three-dimensionally pre-shaped first shoe component particularly well. The last 120 may, for example, comprise one or several chambers, bubbles, etc., which may be filled with air or liquid, and which may be filled independently of one another, so as to adjust to the shape of the three-dimensionally pre-shaped first shoe component 110. In doing so, the last 120 may possibly even be filled such that slight stretching of the material of the first shoe component 110 occurs. This additional tensile strain may provide the first shoe component 110 with additional support on the last 120. In other embodiments, the three-dimensionally pre-shaped first shoe component 110 comprises a plurality of apertures (not shown), which are mounted on corresponding needles or the like on the mounting device 120, in order to align the first shoe component 110 on the mounting device. Herein, the apertures may be arranged in such places of the three-dimensionally pre-shaped first shoe component 110 that they are not visible in the finished shoe 290. The apertures may be arranged such that, for example, they rest between the outsole and the shoe upper in the finished shoe 290.

In certain embodiments, the first shoe components 110 provided in step 140 are mounted on the mounting device 120 in a separate mounting step 150. This step may occur both purely mechanically or manually. It is also possible for manual mounting 150 to be supported mechanically.

The providing step 140 may alternatively comprise manufacturing the three-dimensionally pre-shaped first shoe component 110 directly around the mounting device 120. This may save time, manufacturing effort, additional working steps and machines, as well as material, etc. Such a design may also prevent overexpansion of the material of the first shoe component 110, which might arise during a separate mounting step 150 on the mounting device 120, which would otherwise be necessary. Such a design may also help reduce the number of substandard goods produced by the method 100.

It may furthermore be desirable in certain applications that the three-dimensionally pre-shaped first shoe component 110 be directly tailored to the shoe 290 to be manufactured. The size and the width of the forefoot, for example, may be adjusted precisely "to measure." It may, for example, also be possible to provide different colors, shapes and functions, such as e.g. ventilation apertures at this stage. In certain embodiments, the first shoe components 110 may be provided in different thicknesses or with several areas of a different material thickness each to achieve a cushioning effect, for example. The first shoe components 110 may, for example, be weft-knitted, warp-knitted, braided, or woven with thicker or softer yarns or fibers and/or a more voluminous pattern where the wearer's foot is eventually to be protected from the effect of excessively strong force, e.g. when kicking a ball.

Herein, at least one of the following methods come into consideration, for example, for the manufacture of the three-dimensionally pre-shaped first shoe component 110: three-dimensional weft knitting, three-dimensional warp knitting, braiding, vacuum forming, injection molding, slush molding, casting, pouring, spraying or wrapping of a three-dimensional shape, particularly on a potentially heatable and coolable last 120, and/or printing. Also, fibers could be used as a base material that can, e.g., be braided or wrapped around a heatable and coolable last or the like, potentially under the addition of a bonding agent like glue or the like. Thus, a three-dimensionally pre-shaped first shoe component 110 may also be made from a non-woven textile, or non-textile, material. In certain embodiments, the manufacture comprises circular knitting of the three-dimensionally pre-shaped first shoe component 110 around the mounting device 120.

Where the manufacture of the three-dimensionally pre-shaped first shoe component 110 comprises three-dimensional weaving, warp-knitting, weft-knitting or braiding, different yarns and/or fibers may be used in different regions, as was already mentioned above, in order to influence the functionality of the shoe 290 to be manufactured at this stage. These yarns or fibers may, for example, be yarns/fibers comprising thermoplastic material which are thermoformable, elastic yarns/fibers, metallized yarns/fibers, etc. A person of ordinary skill in the relevant art will understand that such yarns or fibers may have characteristics that allow the material comprising these yarns or fibers to be pre-shaped into the desired three-dimensional shape. In certain embodiments, the material comprising these yarns or fibers may be pre-shaped through a variety of techniques, including but not limited to heat treatment, press-fitting, molding, etc.

As is suggested in FIG. 1, the individually controllable sequence and/or rearrangement of processing steps of the method 200 may, for example, be determined by a computer generated shoe model 115 in a further selection step 130. This may, for example, be performed by the computer 135, on which the shoe model 115 was generated. In this regard, "computer" comprises computers in the conventional sense as well as laptops, tablets, smartphones and other such portable or stationary devices. In other embodiments, the data underlying the model 115 may be sent to a control device (not shown) by the computer 135, which determines the individually controllable sequence and/or rearrangement of processing steps of the method 200 and controls the processing apparatus 205 accordingly. The computer 135 may, for example, be located in some kind of "kiosk," where a potential customer may select or design a computer-generated shoe model 115 and then cause the manufacture of a corresponding pair of shoes. Another possibility may be a fully automatic vending machine that a customer could access outside shopping hours, create his or her own shoe model 115, and have the corresponding shoe 290 manufactured on the spot. This would allow selling and production in all areas outside opening hours, e.g. in cities, at airports, etc.

As a result, the computer generated shoe model 115 may, for example, be selected by a future wearer of the shoe 290 to be manufactured from a predetermined set of shoe models 115 stored in the computer 135 before the individually controllable sequence and/or rearrangement of processing steps of the method 200 is determined. These may, for example, be different models of a football shoe 290, which may differ in color, arrangement of the studs, etc. It is also possible for the selection to occur in a modular manner, i.e. for the desired color to be selected first, then the desired arrangement of the studs, then the desired midsole, etc. from a predetermined selection. This may particularly occur interactively on a screen 135. Alternatively or in addition to this, the selection step 130 of the shoe model may also occur by one or several parameters, e.g. the size or the width of the forefoot, etc., being specified. While this may be less intuitive, it may potentially enable a more precise adjustment to the foot of a future wearer.

Finally, it is also possible that the shoe model 115 is created on the computer 135 from scratch, allowing a large degree of customization of the shoe model 115.

In certain embodiments of the method 100, the selection step 130 of the shoe model also directly influences the providing step 140 of the three-dimensionally pre-shaped first shoe components. Particularly in the case where the providing step 140 comprises manufacturing the three-dimensionally pre-shaped first shoe component 110 around the mounting device 120, the shoe component may be manufactured directly in accordance with the selection on the computer 135.

In certain embodiments, the first shoe components 110 may be provided in step 140 as blanks, e.g. taken from storage, which are not individualized and adjusted to the customer's preferences until the later processing steps of the method 200.

FIG. 2 illustrates certain embodiments of a processing apparatus 205 on which the individually controllable sequence and/or rearrangement of processing steps of the method 200 may take place. The three-dimensionally pre-shaped first shoe component 110 may pass through at least one processing station during processing 200. Four processing stations 230, 240, 250 and 260 are shown in the embodiments of the processing apparatus 205 illustrated in FIG. 2. However, a person of ordinary skill in the relevant art will understand that any suitable number and arrangement of processing stations may be used to achieve the desired result.

In the processing station 230, at least one of the following processing steps may be performed herein: screen printing, digital printing, dye sublimation, sublimation printing, pad printing, spraying on color, applying at least one color-changing material, applying at least one foil element, impregnating with a material, coating with a material, applying at least one glue, flocking, laser cutting, laser engraving, embroidering, thermoforming, locally melting, locally fusing, embossing, laser etching, and/or perfing.

Thus, for example, it is possible to spray pigments on the first shoe component 110 first and then apply glue in various regions or patterns. In doing so, the glue bonds with the pigments. Subsequently, a transfer paper, for example, may be applied, which also adheres to the glue, and when this transfer paper is subsequently removed, the glue and the pigments adhering thereto are therefore also removed. As a result, the regions in which no glue was applied are colored. In certain embodiments, a material, e.g. color, may also be applied all over the first shoe component 110, but only activated locally, e.g. by applying heat or energy. A further possibility involves applying pigments that change color depending on a magnetic field applied. These pigments may be embedded in a plastic carrier, a thermoplastic carrier material or in microcapsules.

At least one second shoe component may be added to the three-dimensionally pre-shaped first shoe component 110 when it passes through processing station 240.

Whether at least one second shoe component is added to a given first shoe component 110 may be controlled individually for each first shoe component 110 and depends on whether or not the shoe 290 to be manufactured is to be equipped with at least one second shoe component.

The at least one second shoe component may comprise at least one of an eyelet, heel cap, toe cap, decoration element, decoration stripe, friction element, abrasion protection element, rib element, reinforcement element, stiffening element, supporting element, cushioning element, fiber element, sole element, and/or outsole.

In certain embodiments, the second shoe component may be present in a pre-fabricated manner and applied to the first shoe component 110 in the processing station 240. (The singular will consistently be used in the following in order to simplify language. However, several second shoe components are comprised by the following statements provided that this is not explicitly precluded). Suction elements, gripping elements or magnetic instruments, for example, may be used for the application. It is also possible for the second shoe component to be provided on a separate carrier film. However, in further embodiments, the second shoe component may be applied to the first shoe component 110 by a printing method.

In further embodiments, glue may be applied to the first shoe component 110 in particular regions, and fibers or such elements may be subsequently applied to these particular regions. Superfluous fibers, which did not bond with the glue, may subsequently be blown off, for example.

The first shoe component 110 may further pass through a third processing station 250. In the third processing station 250, a consolidating or connecting step is performed to connect the potentially present second shoe component with the three-dimensionally pre-shaped first shoe component 110 by at least one of the following processing steps: gluing, welding, high frequency welding, ultrasonic welding, laser welding, pressing, sewing, screwing, riveting, melting together, clipping together, sealing, subjecting to a heat and pressure treatment, and/or subjecting to a steaming treatment.

For example, the first shoe component 110 and the second shoe component may be subjected to pressure and heat at least in partial areas so that all adhesive layers present are activated, creating a resilient connection between the various layers. Also, there could be a number of separate heat pressing steps, for example two heat pressing steps or four heat pressing steps or the like, at the same or at different temperatures. For example, the temperature at a first heat pressing step could be higher or lower than the temperature at a second heat pressing second step and so on. In some embodiments, an uppermost layer of glue may be applied or the first shoe component 110 and/or the second shoe components may be covered with a thin plastic coating, e.g. an elastomer coating.

The workpiece may, for example after this consolidating and/or connecting treatment in the processing station 250, be subjected to further processing steps in the processing station 260. An outsole may be applied, for example. The workpiece may furthermore be taken off the mounting device 120.

It should be noted that the processing stations 230, 240, 250 and 260 may also be a single processing station comprising several substations, for example, or at least one processing tool that is selected according to the individual sequence and/or rearrangement of processing steps. In certain embodiments, the at least one processing station 230, 240, 250, 260 may learn application of at least one of its processing tools by interaction with a human. The processing station 230, 240, 250, 260 or the processing apparatus 205, for example, may comprise an interaction means (not shown) for this purpose, for example a mechanical arm or a kind of exoskeleton. Through this interaction means, a human may then prescribe a movement pattern to the processing apparatus 205 or processing station 230, 240, 250, 260, for example, according to which processing apparatus 205/processing station 230, 240, 250, 260 is to apply the corresponding tool. This may considerably accelerate and facilitate training the processing apparatus 205 and/or processing station 230, 240, 250, 260, respectively, in comparison to conventional programming techniques.

It is further possible for the providing step 140 and/or the potentially necessary mounting step 150 to occur within at least one of the processing stations 230, 240, 250, 260 or the processing apparatus 205 itself, and thus, certain embodiments of the entire manufacturing method may occur within the processing apparatus 205, as was already mentioned. The statements made with regard to steps 140 and 150 above continue to apply in this case.

In the embodiments shown here, the processing apparatus 205 is arranged in a mobile container 210. Here, the mobile container 210 may be at least partially transparent. In the present embodiments, the walls of the container 210 consist of glass or Plexiglas or other transparent materials. The mobile container 210 could furthermore comprise multiple sub-containers which could be arranged into a production unit containing the processing apparatus 205. A shoe 290 is further visible, which was manufactured with the processing apparatus 205 in accordance with various embodiments of a method according to the invention described herein.

The processing apparatus 205 may comprise an interface for the selection of the shoe model 115 by a future wearer of the shoe 290. This may particularly be an interface which enables a selection of the shoe model 115 as described with regard to the selection step 130 in FIG. 1.

For moving the workpiece from one processing station to the next, the processing apparatus 205 may further comprise a transport means 220. This may, for example, be a band conveyor, as shown here. However, it is also possible for this to be a robotic arm or the like which grips the workpiece. A person of ordinary skill in the relevant art will understand that the transport means 120 may also be any suitable conveying device including but not limited to air tables, gravity roller conveyors, belt conveyors, bucket conveyors, vibrating conveyors, chain conveyors, screw conveyors, or other similar mechanical, pneumatic, and/or electrical conveying devices.

It is desirable in certain embodiments if, as explained above, the three-dimensionally pre-shaped first shoe component 110, on the basis of which the workpiece is constructed and processed, is mounted on a mounting device 120, particularly a last 120, during processing. In certain embodiments, the mounting device comprises an engagement which enables such a robotic arm to hook up with the mounting device, thus picking up the mounting device together with the workpiece. This design may be beneficial in that the workpiece may be positioned, turned, arranged, shifted, etc. virtually arbitrarily in space, which is not possible or only in a limited manner by means of a simple transport belt 220.

Figure 3:
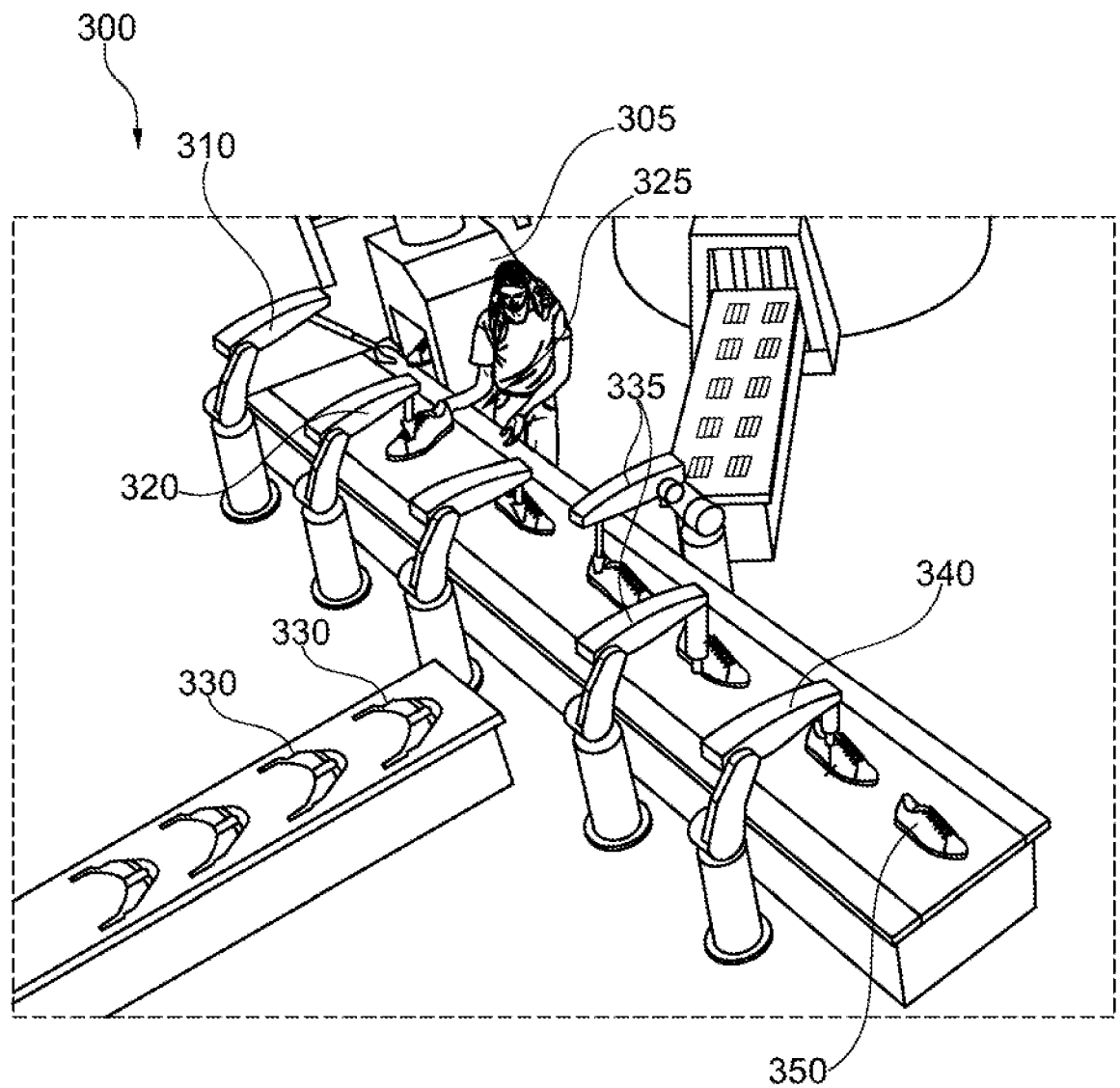
FIG. 3 is a perspective view of a method/apparatus for the manufacture of a shoe, according to certain embodiments of the present invention.
Figure 4:
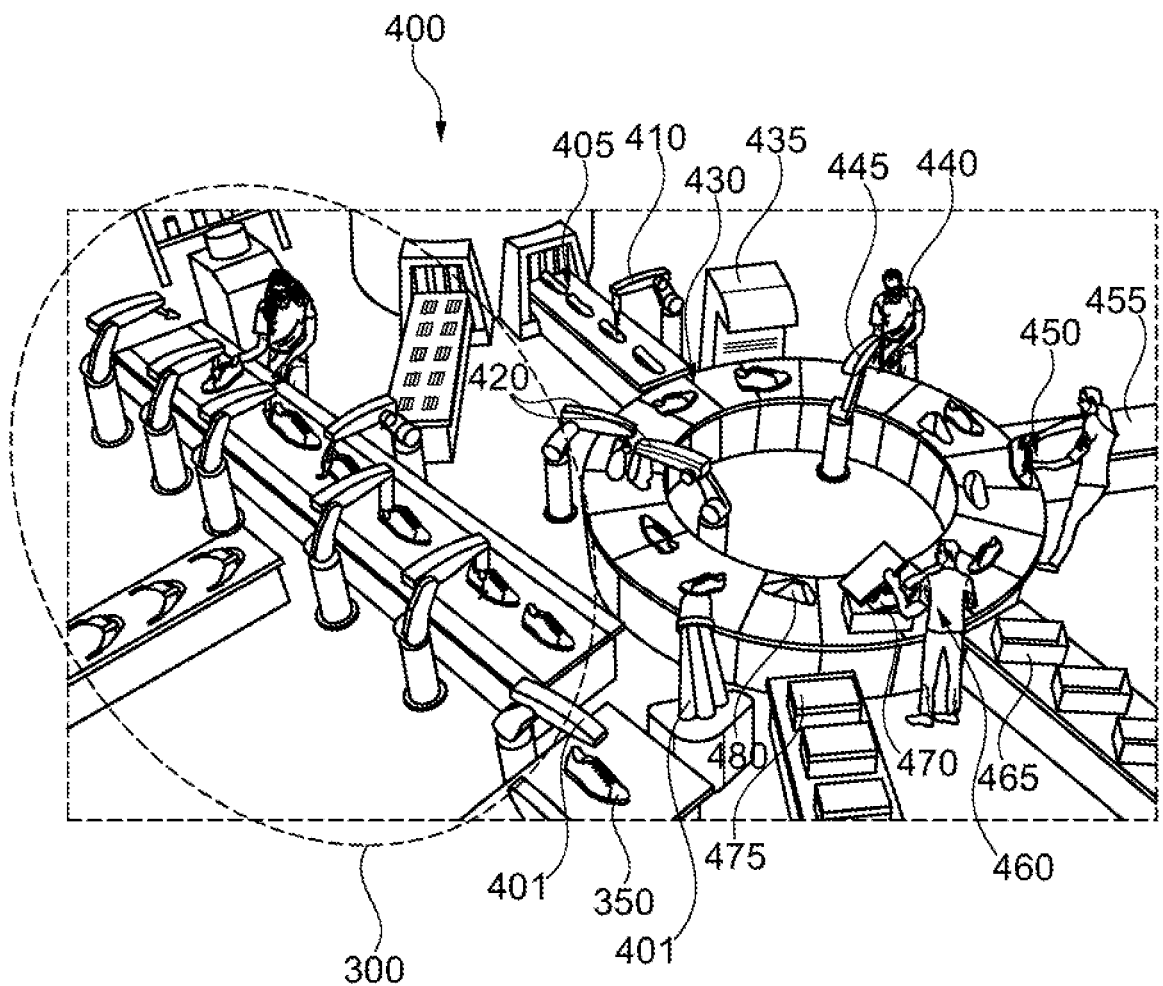
FIG. 4 is a perspective view of a method/apparatus for the manufacture of a shoe, according to certain embodiments of the present invention.

FIGS. 3 and 4 show further embodiments of methods 300, 400 according to the invention and apparatuses according to the invention for manufacturing a shoe or a part of a shoe 350, 470, respectively. Here, so as to avoid unnecessary redundancies, the embodiments are merely roughly sketched. It is clear to the person skilled in the art that the statements made with regard to FIGS. 1 and 2 above regarding the various method steps, processing options and processing stations, etc., are also applicable to the embodiments shown in FIGS. 3 and 4.

In the method 300 shown in FIG. 3, a three-dimensionally pre-shaped first shoe component is first provided at the processing station 305. Weft-knitting of a shoe upper or a shoe shaft may occur here, for example. However, other three-dimensionally pre-shaped first shoe components may also be provided and techniques other than weft-knitting may be used for that.

As an alternative to the direct manufacture of the first shoe components at the processing station 305, the three-dimensionally pre-shaped first shoe component may also, e.g. by the processing station 310, be taken from a depot or storage and provided for further processing.

Here, further processing of the three-dimensionally pre-shaped first shoe component comprises an individually controllable sequence and/or rearrangement of processing steps. Some of the possible processing steps are to be outlined below. Incidentally, as already mentioned, the statements made in connection with FIGS. 1 and 2 also apply.

The provided three-dimensionally pre-shaped first shoe component may, for example, be mounted on a mounting device, such as a last 480 shown in FIG. 4, in a further processing step 325. This may occur manually or also in a partially or completely automated manner, e.g. at the processing station 320. The processing station 320 may, for example, take the last from storage or a depot and provide it for the mounting of the first shoe components. As an alternative to subsequent mounting, the three-dimensionally pre-shaped first shoe component may also be weft-knitted, or manufactured in another way, directly at the processing station 305 around the mounting device, which may be around the last.

At further processing stations 335, at least one second shoe component 330, which was taken from a storage, for example, may be added to the three-dimensionally pre-shaped first shoe component if this is desired. In certain embodiments, the second shoe component 330 may be applied to the three-dimensionally pre-shaped first shoe component at the processing station 335 by printing or the like, for example.

At a further processing station 340, consolidation and/or connection between the first and the second shoe components may be achieved. The consolidating and/or connecting may be performed by at least one of the following processing steps: gluing, welding, high frequency welding, ultrasonic welding, laser welding, pressing, sewing, screwing, riveting, melting together, clipping together, sealing, subjecting to a heat and pressure treatment, and/or subjecting to a steaming treatment. For example, the first shoe components and the second shoe components 330 may be subjected to pressure and heat so that all adhesive layers present are activated, creating a resilient connection between the various layers. Also, there may be a number of separate heat pressing steps, for example two heat pressing steps or four heat pressing steps or the like, at the same or at different temperatures. For example, the temperature at a first heat pressing step may be higher or lower than the temperature at a second heat pressing second step and so on. In certain embodiments, an uppermost layer of glue may be applied or the first and/or second shoe components may be covered with a thin plastic coating, e.g. a polymer coating.

By these processing steps, it is possible for a workpiece 350 to be manufactured that comprises a finished shoe 350. However, it is also possible that the resulting workpiece 350 only comprises a shoe part and that further processing steps, for example the method steps shown in FIG. 4, follow for the shoe to be completed.

The method 400 in FIG. 4 may comprise the method steps of the method 300, which were just discussed. On the basis of the shoe part 350, which may be moved to further processing by a processing station 401, for example, the shoe part 350 may be applied to a sole, for example, at one of the further processing stations 420. The sole may previously have been fetched from storage or a depot by a transport apparatus 405 and provided with glue in a further processing station 410.

After the shoe part 350 and the sole provided with glue have been pressed together at the processing station 420, the workpiece may be placed in a cooler and/or be actively cooled in further processing steps 430, 435, for example, in order to cause the glue to harden. For other glues, which are activated by heat, the workpiece may be treated with heat or energy in further processing steps 430, 435 in order for the glue to harden. Connecting methods other than the use of glues, and thus methods for consolidating and hardening the connection different from the ones described in this paragraph, may obviously also be used in this regard. In this context, reference shall be made to the statements regarding FIGS. 1 and 2 and processing station 340 once more.

After hardening, the workpiece may be removed from the mounting device, e.g. the last 480, in a further processing step. Once again, this may occur manually, by a human worker 440, or also supported by a further processing station 445. However, fully automated removal of the last by processing station 445 is also possible.

Depending on whether or not further shoes 470 are to be manufactured, the last 480 may either be returned to storage or the depot, e.g. by a processing station like the processing station 320 shown in FIG. 3, or it may be used again in order to mount further provided three-dimensionally pre-shaped first shoe components on it analogously to step 325 discussed above. This allows continuous production of (small-scale) series, for example.

In further processing steps 450, 460, shoelaces, which may e.g. be provided via a conveyor belt 455 or other transport means, may be threaded in the workpiece, for example, and/or the finished shoe 470 may be placed into a packaging 465 provided for this and passed on 475 for sale or dispatch. A person of ordinary skill in the relevant art will understand that the transport means may be any suitable conveying device including but not limited to air tables, gravity roller conveyors, band conveyors, belt conveyors, bucket conveyors, vibrating conveyors, chain conveyors, screw conveyors, robotic arms or the like which grips the workpiece, or other similar mechanical, pneumatic, and/or electrical conveying devices.

In this regard, the packaging may also be individually customized to the manufactured shoe 470. If, for example, a future wearer of the shoe 470 selects a shoe model 115 e.g. on a computer 135, which results in manufacture of a corresponding shoe 290, 350, 470, the packaging might e.g. comprise information about the customer's selection such as the shoe size, color, specific properties, the price, etc. In summary, the packaging 370 may be customized with each box being individually printed, cut, and formed on demand. The customization may be purely visible in form of names, logos and so on, or may be designed perfectly to fit each shoe 470, or more generally to fit each manufactured piece of apparel or sporting good.

It should be noted here once again that the embodiments shown in FIGS. 1-4 are merely examples that are intended to make the invention's potential obvious to the person skilled in the art. In certain existing embodiments, the precise number, sequence and/or rearrangement and/or nature of the individual processing steps may also differ from the methods 100, 200, 300 and 400 shown here.

Figure 5:
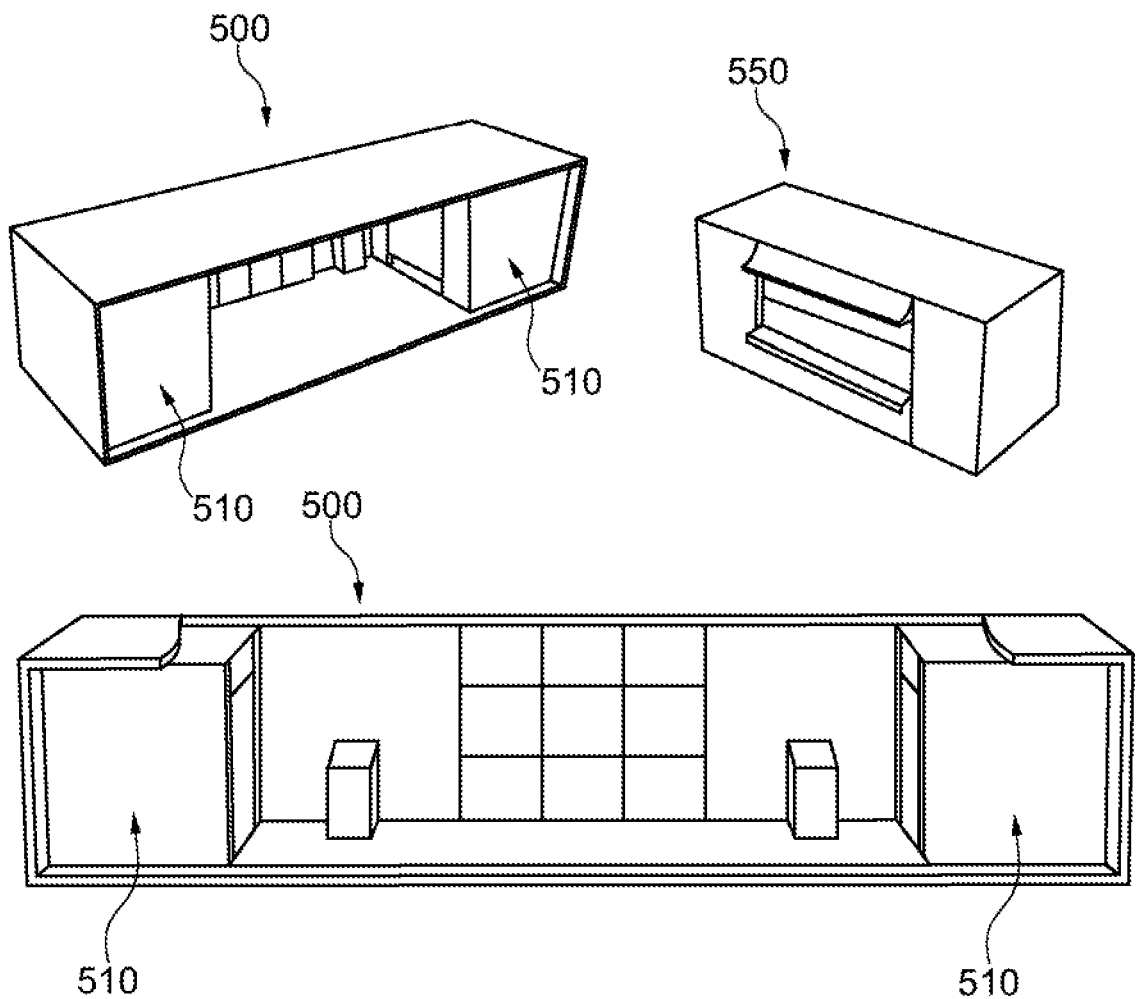
FIG. 5 are front and perspective views of a portable sales stand comprising an apparatus for the manufacture of a shoe, according to certain embodiments of the present invention.

FIG. 5 shows embodiments of a mobile sales stand 500, with the mobile sales stand 500 comprising at least one apparatus 510 for performing certain embodiments of a method according to the invention, e.g. one of the methods 200, 300 and 400 shown in FIGS. 2-4. Furthermore, FIG. 5 shows a sales or consultancy stand 550. For example, at this consultancy stand 550, a customer may seek advice about suitable shoe models or the customer may individually design a desired shoe model. After designing the desired shoe model, the production apparatus 510 may, via a control means, for example, be prompted to manufacture the shoe model designed by the customer.

The mobile sales stand 500 may be used, for example, at trade fairs, major events, sports events, etc. In certain embodiments, the mobile sales stand may be placed in a department store.

Figure 6:
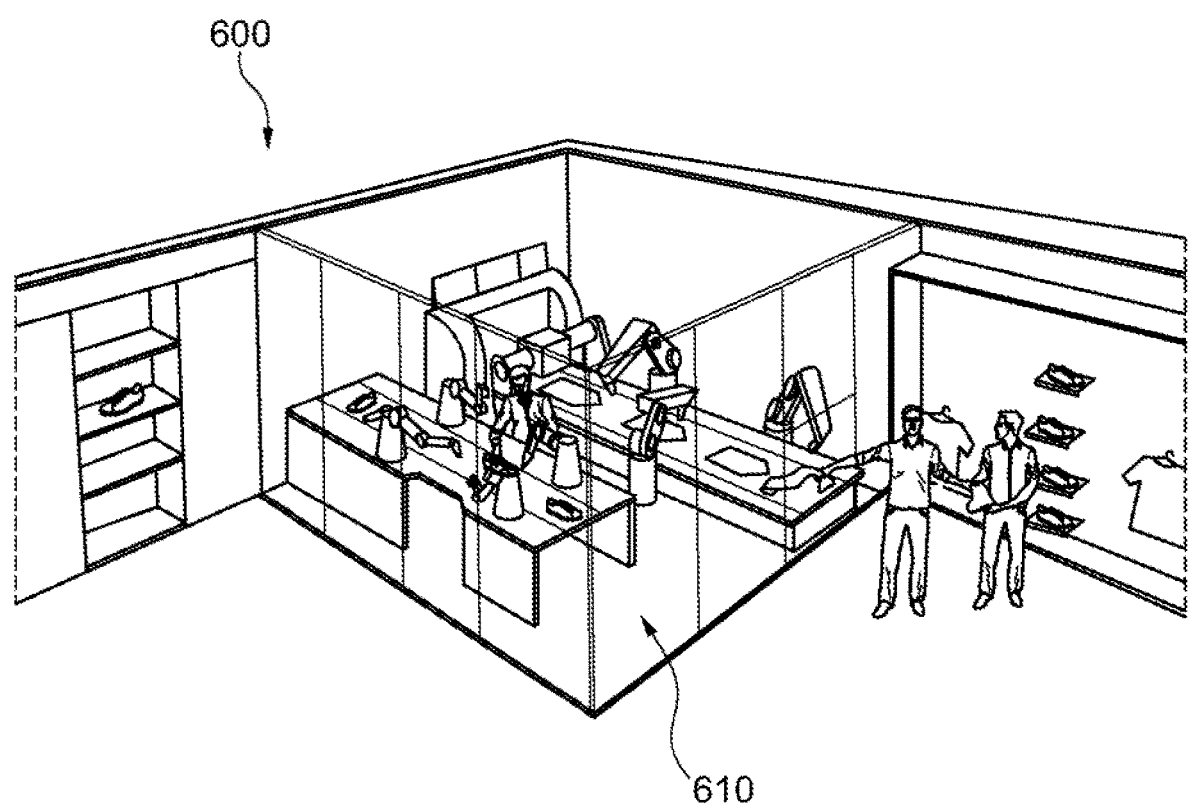
FIG. 6 is a perspective view of a business premises comprising an apparatus for the manufacture of a shoe, according to certain embodiments of the present invention.

Finally, FIG. 6 shows embodiments of a sales room 600 comprising an apparatus 610 for performing certain embodiments of a method according to the invention. Apparatus 610 may, for example, be one of the embodiments of an apparatus shown in conjunction with one of the methods 200, 300 and 400 discussed in the context of FIGS. 2-4.

In the following, further examples are described to facilitate the understanding of the invention:

1. Method (100; 300; 400) for the manufacture of a shoe (290; 350; 470), which comprises the following steps:
    a. Providing (140; 305; 310) a three-dimensionally pre-shaped first shoe component (110); and
    b. Processing (200) the three-dimensionally pre-shaped first shoe component (110),
    c. wherein the processing (200) comprises an individually controllable succession of processing steps.
2. Method according to the preceding example, wherein the individually controllable succession of processing steps is determined from a computer generated shoe model (115).
3. Method according to the preceding example, wherein the shoe model (115) is selected from a predetermined set of shoe models that are stored on a computer (135).
4. Method according to one of the two preceding examples, wherein the shoe model (115) is selected by setting one or more parameters.
5. Method according to one of the preceding examples, wherein during processing (200) the three-dimensionally pre-shaped first shoe component (110) is arranged on a mounting device (120; 480) which comprises a shape that at least partially corresponds to the three-dimensional pre-shape of the first shoe component (110).
6. Method according to the preceding example, wherein the mounting device (120; 480) comprises a last (120; 480).
7. Method according to the preceding examples, wherein the last (120; 480) comprises a variable volume, preferably being provided inflatable.
8. Method according to one of the three preceding examples, wherein step a. comprise a manufacture (140; 305) of the three-dimensionally pre-shaped first shoe component (110) around the mounting device (120; 480).
9. Method according to one of the preceding examples, wherein step a. comprises one or more of the following methods for the manufacture (140; 305) of the three-dimensionally pre-shaped first shoe component (110): three-dimensional weft knitting, three-dimensional warp knitting, braiding, vacuum forming, injection molding, slush molding, casting, pouring, spraying or wrapping of a three-dimensional shape, printing.
10. Method according to the preceding examples, wherein the method for the manufacture (140; 305) of the three-dimensionally pre-shaped first shoe component (110) comprises the circular knitting of the first shoe component (110).
11. Method according to one of the preceding examples, wherein the three-dimensionally pre-shaped first shoe component (110) passes through at least one processing station (150; 230; 240; 250; 260; 320; 335; 340; 401; 420; 430; 435; 445) during processing (200).
12. Method according to the preceding examples, wherein in the at least one processing station (230) at least one of the following processing steps is performed: screen printing, digital printing, dye sublimation, sublimation printing, pad printing, spraying on color, applying at least one color-changing material, applying at least one foil element, impregnating with a material, coating with a material, applying at least one glue, flocking, laser cutting, laser engraving, embroidering, thermoforming, locally melting, locally fusing, embossing, laser etching, perfing.
13. Method according to one of the two preceding examples, wherein the at least one processing station (240; 335) adds at least one second shoe component (330) to the three-dimensionally pre-shaped first shoe component (110).
14. Method according to the preceding examples, wherein the at least one second shoe component (330) comprises one or more of the following shoe elements: eyelets, heel caps, toe caps, decoration elements, decoration stripes, friction elements, abrasion protection elements, rib elements, reinforcement elements, stiffening elements, supporting elements, cushioning elements, fiber elements, sole elements, outsoles.
15. Method according to one of the two preceding examples, wherein the at least one processing station (250; 340) is provided to connect the second shoe component (330) with the three-dimensionally pre-shaped first shoe component (110) by one or more of the following steps: gluing, welding, high frequency welding, ultrasonic welding, laser welding, pressing, sewing, screwing, riveting, melting together, clipping together, sealing, subjecting to a heat and pressure treatment, subjecting to a steaming treatment.
16. Method according to one of the preceding examples 11-15, wherein the at least one processing station (260; 445) is provided to remove the three-dimensionally pre-shaped first shoe component (110) and/or the second shoe component (330) from the mounting device (120; 480).
17. Method according to one of the preceding examples 11-16, wherein the at least one processing station (150; 230; 240; 250; 260; 320; 335; 340; 401; 420; 430; 435; 445) comprises one or more processing tools, which are used in accordance with the individual succession of processing steps.
18. Method according to the preceding example, wherein the processing station (150; 230; 240; 250; 260; 320; 335; 340; 401; 420; 430; 435; 445) learns the use of at least one processing tool via interaction with a human.
19. Method according to the preceding example, wherein the interaction comprises demonstrating a movement pattern for the use of the at least one processing tool.
20. Method according to one of the preceding examples, wherein the three-dimensionally pre-shaped first shoe component (110) comprises at least a part of a shoe upper.
21. Apparatus (205; 300; 400; 510; 610), provided to perform a method according to one of the examples 1-20.
22. Apparatus (205; 300; 400; 510; 610) according to the preceding example, wherein the apparatus (205; 300; 400; 510; 610) comprises an interface (135) for the selection of the shoe model (115) by a future wearer of the shoe (290; 470).
23. Apparatus (205; 510) according to one of the two preceding examples, wherein the apparatus (205; 510) is arranged within a movable container (210; 500).
24. Apparatus (205) according to the preceding example, wherein the container (210) is at least partially transparent.
25. Shoe (290; 470), wherein the shoe has been manufactured by use of a method according to one of the examples 1-20.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:
1. A method for the manufacture of a plurality of shoes, the method comprising:
producing a plurality of three-dimensionally pre-shaped shoe uppers relative to a plurality of three-dimensionally shaped mounting devices, each respective pre-shaped shoe upper being produced by constructing a material directly on a corresponding one of the mounting devices in a process that includes spraying the material directly on the corresponding one of the mounting devices; and
processing the plurality of three-dimensionally pre-shaped shoe uppers to produce the plurality of shoes, wherein the processing comprises an individually controllable succession of processing steps that proceed in an automated manner.
2. The method according to claim 1, wherein the individually controllable succession of processing steps is determined from a computer generated shoe model.
3. The method according to claim 2, wherein the computer generated shoe model is selected from a predetermined set of shoe models that are stored on a computer.
4. The method according to claim 2, wherein the computer generated shoe model is selected by setting one or more parameters.

5. The method according to claim 4, wherein the parameters include at least one of:
  type of shoe, shoe size, dimension of particular foot area of a person, weight of a person, tendency of a person to have a neutral behavior of rolling over, tendency of a person to overpronate, tendency of a person underpronate, expected type of use, color, or arrangement of studs.

6. The method according to claim 1, further comprising passing the plurality of three-dimensionally pre-shaped shoe uppers through at least one processing station and processing the plurality of three-dimensionally pre-shaped shoe uppers in the at least one processing station.

7. The method according to claim 6, wherein processing the plurality of three-dimensionally pre-shaped shoe uppers in the at least one processing station comprises performing at least one of the following processing actions: screen printing, digital printing, dye sublimation, sublimation printing, pad printing, color, color-changing material application, foil element application, impregnating, coating, glue application, flocking, laser cutting, laser engraving, embroidering, thermoforming, locally melting, locally fusing, embossing, laser etching, or perfing.

8. The method according to claim 7, wherein processing the plurality of three-dimensionally pre-shaped shoe uppers in the at least one processing station comprises adding at least one shoe component to each three-dimensionally pre-shaped shoe upper.

9. The method according to claim 8, wherein the at least one shoe component comprises at least one of an eyelet, heel cap, toe cap, decoration element, decoration stripe, friction element, abrasion protection element, rib element, reinforcement element, stiffening element, supporting element, cushioning element, fiber element, sole element, or outsole.

10. The method according to claim 8, wherein the at least one shoe component is added to each three-dimensionally pre-shaped shoe upper by at least one of gluing, welding, high frequency welding, ultrasonic welding, laser welding, pressing, sewing, screwing, riveting, melting together, clipping together, sealing, subjecting to a heat and pressure treatment, or subjecting to a steaming treatment.

11. The method according to claim 6, wherein processing the plurality of three-dimensionally pre-shaped shoe uppers in the at least one processing station comprises removing each three-dimensionally pre-shaped shoe upper from each mounting device.

12. The method according to claim 6, wherein the at least one processing station comprises at least one processing tool that is used in accordance with the individually controllable succession of processing steps.

13. The method according to claim 1, wherein the plurality of three-dimensionally shaped mounting devices comprises at least one mounting device having a three-dimensional shape that corresponds to a first shoe model shape for a first shoe model and at least one other mounting device having a three-dimensional shape that corresponds to a second shoe model shape for a second shoe model,
  wherein at least one shoe upper of the plurality of three-dimensionally pre-shaped shoe uppers has a three-dimensional pre-shape that corresponds to the first shoe model shape and at least one other shoe upper of the plurality of three-dimensionally pre-shaped shoe uppers has a three-dimensional pre-shape that corresponds to the second shoe model shape, and
  wherein at least one shoe of the plurality of shoes is the first shoe model and at least one other shoe of the plurality of shoes is the second shoe model.

* * * * *